(12) United States Patent
Yamakawa et al.

(10) Patent No.: US 7,108,943 B2
(45) Date of Patent: Sep. 19, 2006

(54) STRUCTURE OF CONNECTING BATTERY TERMINALS TO BUS BARS

(75) Inventors: Shuji Yamakawa, Mie (JP); Eriko Yuasa, Mie (JP); Kouji Ota, Aichi (JP); Hiroki Hirai, Aichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 415 days.

(21) Appl. No.: 10/269,973

(22) Filed: Oct. 15, 2002

(65) Prior Publication Data

US 2003/0108789 A1    Jun. 12, 2003

(30) Foreign Application Priority Data

Oct. 16, 2001    (JP) .............................. 2001-318248

(51) Int. Cl.
*H01M 2/06* (2006.01)
(52) U.S. Cl. ...................................... 429/180; 429/123
(58) Field of Classification Search ................ 429/123, 429/178, 65, 180
See application file for complete search history.

(56) References Cited

U.S. PATENT DOCUMENTS

| 5,169,338 | A | * | 12/1992 | Dewar et al. ................ 439/522 |
| 5,357,142 | A | * | 10/1994 | Kubota et al. .............. 307/10.1 |
| 6,051,782 | A | * | 4/2000 | Wagner ...................... 174/52.1 |
| 2001/0028197 | A1 | * | 10/2001 | Yamane et al. ............ 307/10.1 |

FOREIGN PATENT DOCUMENTS

JP    2000-208173    *    7/2000

* cited by examiner

*Primary Examiner*—Mark Ruthkosky
(74) *Attorney, Agent, or Firm*—Oliff & Berridge, PLC

(57) ABSTRACT

In a structure of connecting battery terminals 101 and 102 to bus bars 16 and 17 wherein the plus terminal 102 and the minus terminal 101, projecting from an upper surface of a battery 100, are connected respectively to the pair of bus bars 17 and 16 projecting from a relay block 10, an insulative-resin cover portion 11b, which covers at least an upper surface of one (17) of the bus bars, and another insulative-resin cover 11g, which covers at least a lower surface of the other bus bar 16, project from a block body 11 of the relay block 10, thereby preventing short-circuit between the two bus bars 16 and 17.

7 Claims, 6 Drawing Sheets

STRUCTURE OF CONNECTING BATTERY TERMINALS TO BUS BARS

BACKGROUND OF THE INVENTION

This invention relates to a structure of connecting battery terminals to bus bars, and more particularly to such a structure in which short-circuiting will not occur between a pair of bus bars respectively connecting terminals of a high-voltage battery, mounted on an automobile, to a relay block.

Generally, a battery, having a rated voltage of 12V (maximum voltage of 14V) has heretofore been mounted on passenger cars, and the maximum voltage of 14V is supplied from the battery to bus bars or the like within an electric connection box, and the electric power is distributed by internal circuits in the electric connection box, and through wires, connected to the internal circuits, electrical equipments, mounted on the automobile, are controlled, and also signals are transmitted and received.

In recent years, the number of electrical equipments, mounted on an automobile, is increasing, and besides there is a tendency to increase the amount of supply of electric current to each electrical equipment, and therefore there is proposed a construction using a high-voltage battery for supplying a higher voltage (e.g. 42V) than that of the conventional batteries.

As shown in FIG. 6A, high voltage is applied to internal circuits of a relay block 1 connected via bus bars 2 and 3 to a plus (+) terminal 101 and a minus (−) terminal 102 of the high-voltage battery 100, and the internal circuits form branch circuits so as to control the supply of the electric power to various electrical equipments, and circuit protection function parts, such as a fusible link 1a and fuses 1b, are provided to prevent excess current from flowing to the electrical equipments.

However, the bus bars 2 and 3, connecting the high-voltage battery 100 to the relay block 1, are exposed to the exterior, and therefore when a screwdriver D or the like is inadvertently placed on the bus bars 2 and 3 during the working in such a manner that a metal portion Da of the screwdriver D connects the bus bars 2 and 3 together in a bridging manner as shown in FIG. 6B, short-circuiting occurs, and this is particularly dangerous since the voltage of the battery 100 is high.

SUMMARY OF THE INVENTION

This invention is made in view of the above problem, and an object of the invention is to provide a simple structure in which short-circuiting will not occur between a pair of bus bars connected respectively to plus (+) and minus (−) terminals of a battery.

The above problem is solved by a structure of the invention for connecting battery terminals to bus bars wherein the plus terminal and the minus terminal, projecting from an upper surface of the battery, are connected respectively to the pair of bus bars projecting from a relay block; characterized in that:

an insulative-resin cover, which covers at least an upper surface of one of the bus bars, and another insulative-resin cover, which covers at least a lower surface of the other bus bar, project from a block body of the relay block, thereby preventing short-circuit between the two bus bars.

The battery is a high-voltage battery for producing a voltage in a range of between 42V and 200V.

In the above structure, at least the upper surface of one of the pair of bus bars, connected respectively to the plus terminal and minus terminal projecting from the upper surface of the battery, is covered with the insulative-resin cover, while at least the lower surface of the other bus bar is covered with another insulative-resin cover. Therefore, for example, even if a metallic object, such as a screwdriver, is placed on the upper surfaces of the two bus bars in a bridging manner, the insulative-resin cover is interposed between at least one of the bus bars and the metallic object, and therefore the one bus bar is insulated from this metallic object, so that the development of short-circuiting is prevented.

Namely, even if the other the bus bar is brought into direct contact with the metallic object, the metallic object is insulated from the one bus bar, and therefore the two bus bars will not be electrically connected together via the metallic object, so that the short-circuiting will not occur.

Also, even if the metallic object, such as a screwdriver, is put on the lower surfaces of the two bus bars in a bridging manner, the short-circuiting is prevented for the same reason described above.

At least the upper surface of the one bus bar is covered with the insulative-resin cover, while at least the lower surface of the other bus bar is covered with the insulative-resin cover. Thus, only one surface or side of each bus bar is covered with the insulative-resin cover, and with this construction the short-circuiting can be prevented at both of the upper and lower sides, and therefore the material cost for the insulative-resin covers can be reduced, and also these covers can be simplified in construction.

Each of the insulative-resin covers does not extend as far as a mounting hole formed through a distal end portion of the corresponding bus bar, so that the mounting hole is exposed, and the mounting holes, formed respectively through the two bus bars, are fitted respectively on the plus terminal and minus terminal of the battery, and are fixed thereto by bolts fastened respectively to the plus and minus terminals.

Thus, merely by fitting the mounting holes of the bus bars respectively on the plus and minus terminals of the battery, the bus bars can be easily connected to the respective battery terminals, and by fastening the bolts respectively to the battery terminals, the bus bars can be fixed in a stable manner, thereby preventing the incomplete connection and the like.

The mounting hole portion of each bus bar to be contacted with the plus or minus terminal of the battery and the bolt extends beyond the corresponding insulative-resin cover, and hence is exposed, and therefore the reliability of the electrical connection is enhanced.

DETAILED DESCRIPTION OF THE PREFERRED EMBODIMENTS

Figure 1:
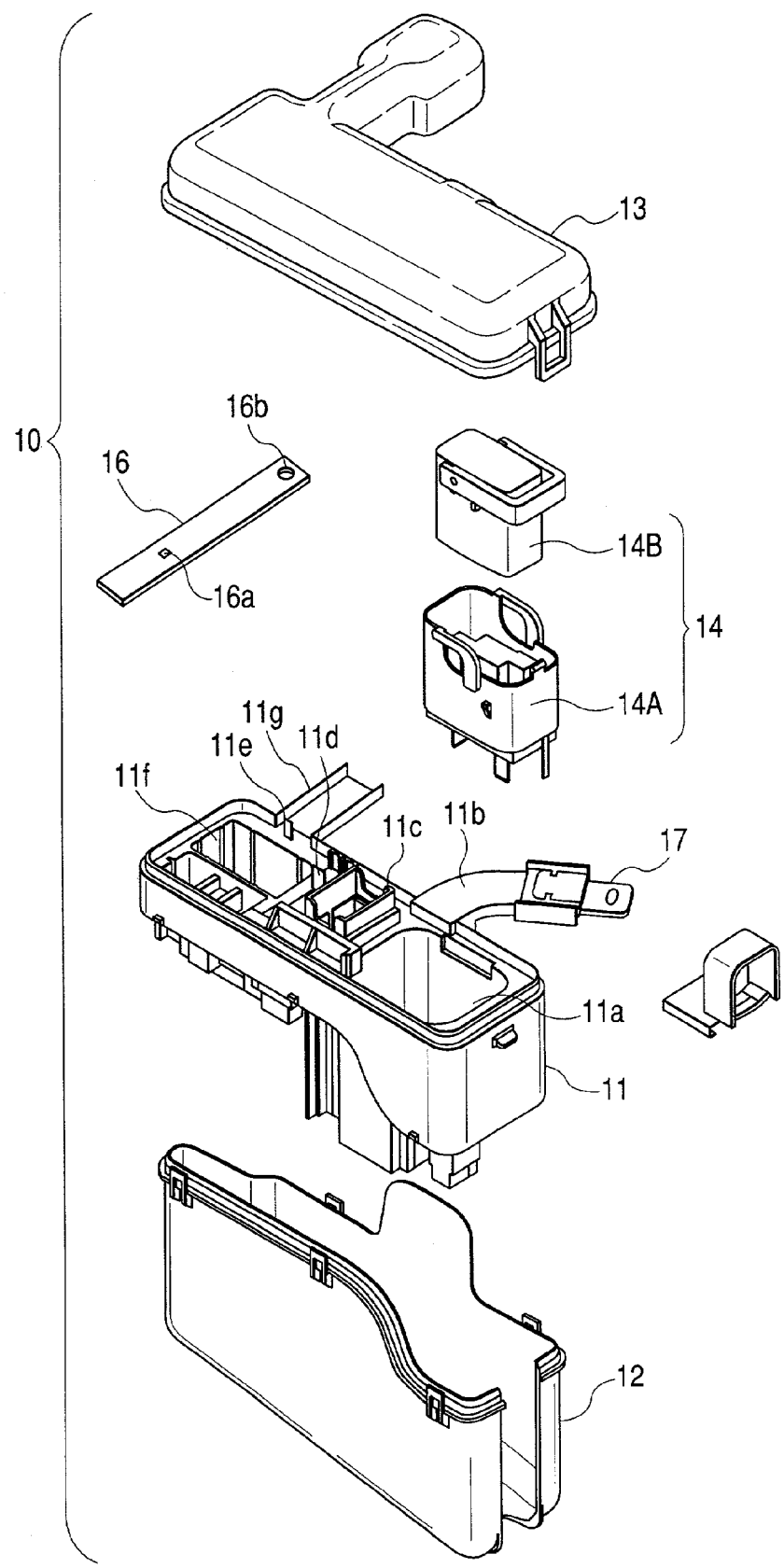
FIG. 1 is an exploded, perspective view of a first embodiment of a relay block of the present invention.
Figure 2:
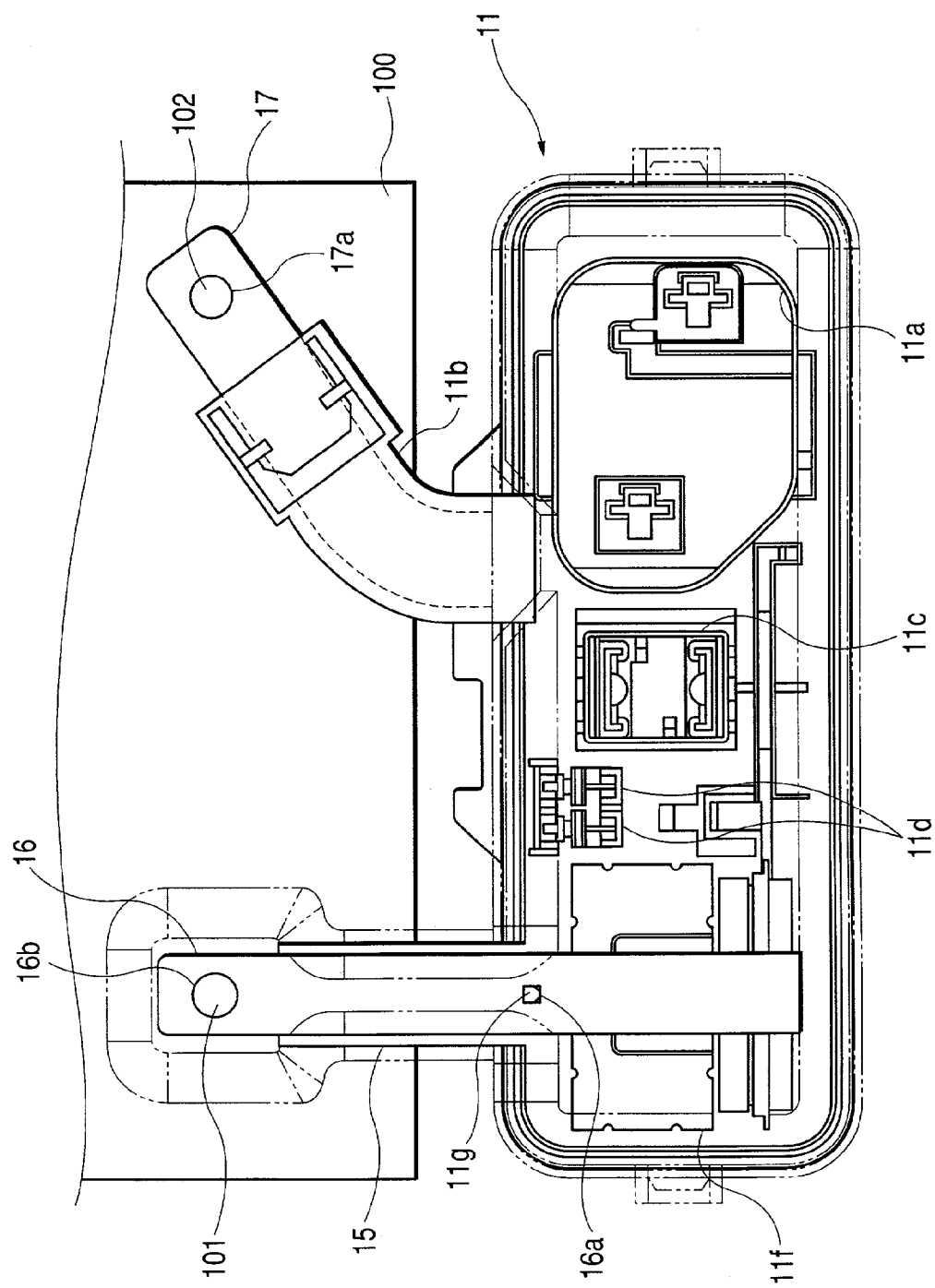
FIG. 2 is a top plan view showing a condition in which the relay block is connected to a battery via bus bars.

FIG. 1 is an exploded, perspective view of a relay block 10 for connection to a batter 100 of a high voltage in the range of between 42V and 200V.

The relay block 10 includes a block body 11 which is covered with a lower cover 12 and an upper cover 13. A receiving portion 11a for receiving a fixing member 14A of a protective device 14 for interrupting the supply of electric power from the battery is provided at one end portion of the block body 11, and a current sensor-receiving portion 11f is provided at the other end portion of the block body 11, and a fusible link-receiving portion 11c and a fuse-receiving portion 11d are provided at a central portion of the block body.

The fixing member 14A of the protective device 14 is received and fixed in the receiving portion 11a, and a movable member 14B is releasably fitted relative to the fixing member 14A, and is fixed thereto.

The protective device 14 is of such a construction that at the time of maintenance, the movable member 14B is removed from the fixing member 14A, thereby interrupting the circuit.

An insulative-resin cover portion 11b, having an inverted channel-shaped cross-section, extends generally arcuately from that portion of the block body 11 disposed near to the fusible link-receiving portion 11c provided at the central portion of the block body 11, and a bus bar 17 for connection to an internal circuit of the relay block 10 is received in this cover portion 11b, and a distal end portion of this bus bar 17, having a mounting hole 17a for connection to a plus (+) terminal 102 of the battery 100 is exposed.

An insulative-resin cover portion 11g, having a channel-shaped cross-section, extends linearly from that portion of the block body 11 disposed near to the current sensor-receiving portion 11f provided at the other end portion of the block body 11, and a bus bar 16 for connection to the internal circuit of the relay block 10 is received in this cover portion 11g, and a distal end portion of this bus bar 16, having a mounting hole 16b for connection to a minus (−) terminal 101 of the battery 100 is exposed.

A retaining claw 11e, projecting from an upper surface of the block body 11, is retainingly engaged in a retaining hole 16a in the bus bar 16, thereby fixing the bus bar 16 to the block body 11.

Figure 3:
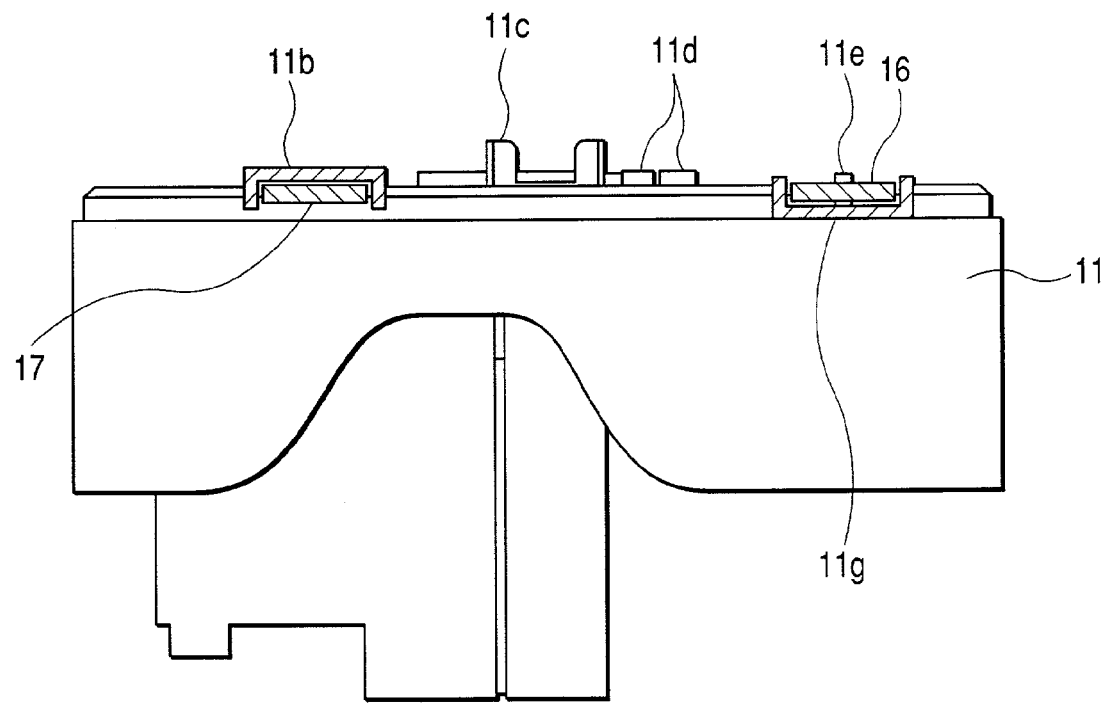
FIG. 3 is a schematic, side-elevational view of a block body.

Namely, as shown in FIG. 3, the bus bar 17 for connection to the plus terminal 102 of the battery 100 is covered at its upper and opposite side edges with the insulative-resin cover portion 11b while a lower surface of this bus bar 17 is exposed. On the other hand, the bus bar 16 for connection to the minus terminal 101 is covered at its lower surface and opposite side edges with the insulative-resin cover portion 11g while an upper surface of this bus bar 16 is exposed.

The mounting holes 16b and 17a, formed respectively through the bus bars 16 and 17, are fitted respectively on the minus terminal 101 and plus terminal 102 of the battery 100, and are fixed thereto by bolts (not shown) fastened respectively to the minus and plus terminals 101 and 102.

In the above structure, the upper surface of the bus bar 17, connected to the plus terminal 102 projecting from the upper surface of the battery 100, is covered with the insulative-resin cover portion 11b, and therefore for example, even if a metallic object, such as a screwdriver, is placed on the upper surfaces of the two bus bars 16 and 17 in a bridging manner, the bus bar 17 is insulated from this metallic object by the insulative-resin cover portion 11b interposed between the bus bar 17 and the metallic object, and therefore the occurrence of short-circuiting is prevented.

Namely, even if the upper surface of the bus bar 16 is brought into direct contact with the metallic object, the metallic object is insulated from the bus bar 17, and therefore the two bus bars 16 and 17 will not be electrically connected together via the metallic object, so that the short-circuiting will not occur.

On the other hand, the lower surface of the bus bar 16, connected to the minus 101, projecting from the upper surface of the battery 100, is covered with the insulative-resin cover portion 11g, and therefore for example, even if a metallic object, such as a screwdriver, is put on the lower surfaces of the two bus bars 16 and 17 in a bridging manner, the bus bar 16 is insulated from this metallic object by the insulative-resin cover portion 11g interposed between the bus bar 16 and the metallic object, and therefore the occurrence of short-circuiting is prevented similarly as described above.

In the above structure, the short-circuiting due to the metallic object is prevented on both of the upper and lower sides without the need for covering both surfaces of each of the bus bars 16 and 17, and therefore the material cost for the insulative-resin cover portions 11b and 11g can be reduced, and also these cover portions can be simplified in construction.

And besides, in this embodiment, the insulative-resin cover portions 11b and 11g have the inverted channel-shaped cross-section and the channel-shaped cross-section, respectively, and cover the opposite side edges of the bus bars 16 and 17 also, and therefore the short-circuiting is positively prevented.

Although the relay block 10 is used in this embodiment, the above structure of connecting the battery terminals to the bus bars can be applied to any other suitable device so as to prevent the occurrence of short-circuiting in so far it is of the type which is connected to plus and minus terminals of a battery (particularly of a high voltage) via bus bars.

That (upper or lower) surface of each bus bar to be protected by the corresponding insulative-resin cover may be replaced by the opposite surface, and more specifically the lower surface of the bus bar 17 to be connected to the plus terminal 102 of the battery 100 may be covered with the insulative-resin cover while the upper surface of the bus bar 16 to be connected to the minus terminal 101 of the battery 100 may be covered with the insulative-resin cover.

Figure 4:
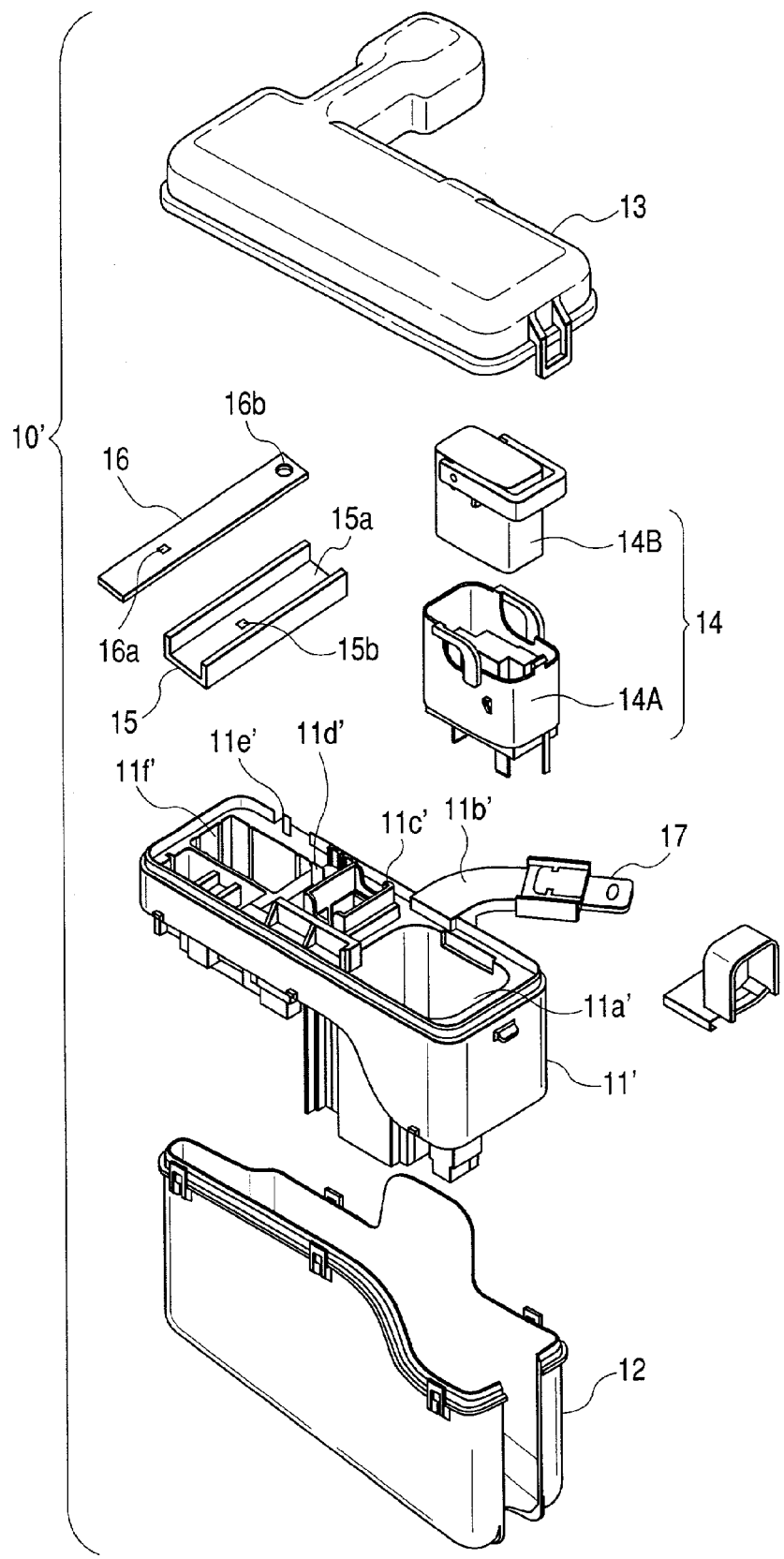
FIG. 4 is an exploded, perspective view of a second embodiment of a relay block of the invention.
Figure 5:
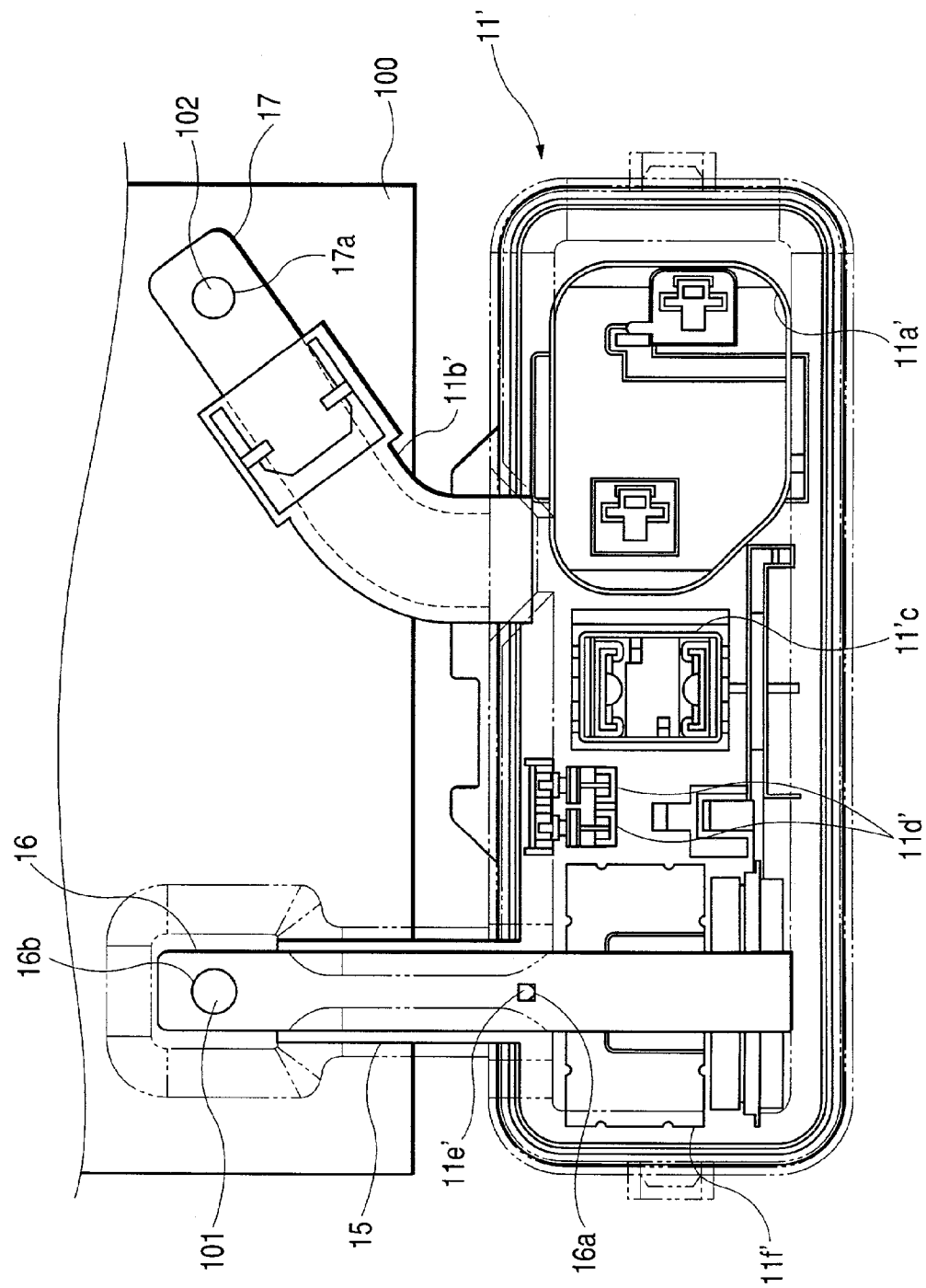
FIG. 5 is a top plan view showing a condition in which the relay block is connected to a battery via bus bars.
Figure 6A:
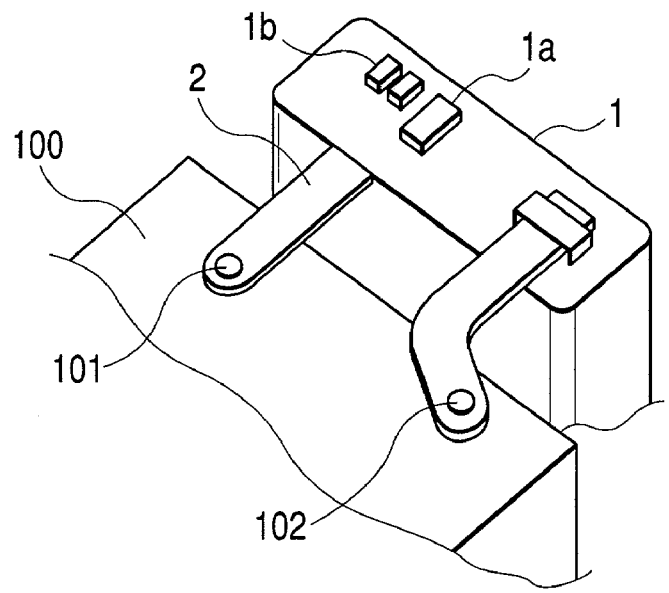
FIG. 6A is a perspective view showing a condition in which a conventional relay block is connected to a battery.
Figure 6B:
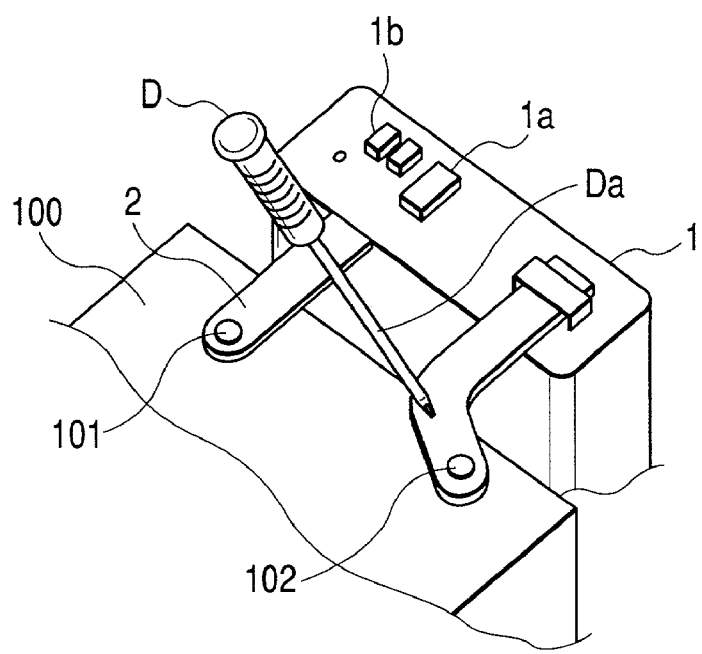
FIG. 6B is a perspective view showing a problem.

FIGS. 4 and 5 show a second embodiment.

This embodiment differs from the first embodiment in that an insulative-resin cover 15 for covering a bus bar 16 is separate from a block body 11'.

The insulative-resin cover 15 has a channel-shaped cross-section, and has a retaining hole 15b formed through a central portion of a bottom plate portion 15a thereof.

The insulative-resin cover 15 is mounted across a current sensor-receiving portion 11f of the block body 11', and the bus bar 16 for connection to an internal circuit of a relay block 10' is received in the insulative-resin cover 15, and a distal end portion of the bus bar 16, having a mounting hole 16b for connection to the minus terminal 101 of the battery 100, is exposed.

A retaining claw 11e', projecting from an upper surface of the block body 11', is retainingly engaged in the retaining hole 15b, formed in the insulative-resin cover 15, and a retaining hole 16a in the bus bar 16, thereby fixing the insulative-resin cover 15 and the bus bar 16 to the block body 11'.

The other construction is the same as that of the first embodiment, and therefore explanation thereof will be omitted.

In this embodiment, although only one insulative-resin cover 15 is in the form of a separate member, the other insulative-resin cover portion 11' may be also in the form of a separate member.

As is clear from the foregoing description, in the present invention, at least the upper surface of one of the pair of bus bars, connected respectively to the plus terminal and minus terminal of the battery, is covered with the insulative-resin cover, while at least the lower surface of the other bus bar is covered with another insulative-resin cover. Therefore, for example, even if a metallic object, such as a screwdriver, is placed on the upper surfaces of the two bus bars in a bridging manner, the one bus bar is insulated by the insulative-resin cover interposed between this bus bars and the metallic object, so that the development of short-circuiting can be prevented.

Also, even if the metallic object is put on the lower surfaces of the two bus bars in a bridging manner, the short-circuiting is prevented for the same reason described above.

Only one surface or side of each bus bar is covered with the insulative-resin cover, and with this construction the short-circuiting due to the metallic object can be prevented at both of the upper and lower sides, and therefore the material cost for the insulative-resin covers can be reduced, and also these covers can be simplified in construction.

What is claimed is:

1. A structure of connecting battery terminals to bus bars comprising:
    a pair of bus bars projecting from a relay block;
    a plus terminal and a minus terminal projecting from an upper surface of a battery, being connected respectively to said bus bars;
    a first insulative-resin cover detachably attached to one of said bus bars and covering an upper surface of the one of said bus bars; and
    a second insulative-resin cover detachably attached to an other of said bus bars and covering a lower surface of the other bus bar,
    said first and second covers projecting from a block body of said relay block, to prevent short-circuiting from developing between said bus bars, wherein the first insulative-resin cover and the second insulative-resin cover are each integrally formed with the block body.

2. The structure of connecting battery terminals to bus bars according to claim 1, wherein
    said battery is a high-voltage battery for producing a voltage in a range of between 42V and 200V.

3. The structure of connecting battery terminals to bus bars according to claim 1, wherein
    each of said insulative-resin covers extends along a corresponding bus bar, and terminates short of a mounting hole formed through a distal end portion thereof, and
    said mounting holes are exposed, formed respectively through said two bus bars, fitted respectively on said plus terminal and minus terminal of said battery, and fixed thereto by bolts fastened respectively to said plus and minus terminals.

4. The structure of connecting battery terminals to bus bars according to claim 2, wherein
    each of said insulative-resin covers extends along a corresponding bus bar, and terminates short of a mounting hole formed through a distal end portion thereof, and
    said mounting holes are exposed, formed respectively through said two bus bars, fitted respectively on said plus terminal and minus terminal of said battery, and fixed thereto by bolts fastened respectively to said plus and minus terminals.

5. The structure of connecting battery terminals to bus bars according to claim 1, wherein at least one of the first insulative-resin cover and the second insulative-resin cover has an inverted channel-shaped cross-section.

6. The structure of connecting battery terminals to bus bars according to claim 1, wherein at least one of the first insulative-resin cover and the second insulative-resin cover extend arcuately from the block body.

7. The structure of connecting battery terminals to bus bars according to claim 1, wherein the first insulative-resin cover covers only an upper surface of the one of said bus bars and the second insulative-resin cover covers only a lower surface of the other bus bar.

* * * * *